United States Patent [19]
Suthersan et al.

[11] Patent Number: 6,116,816
[45] Date of Patent: Sep. 12, 2000

[54] IN SITU REACTIVE GATE FOR GROUNDWATER REMEDIATION

[75] Inventors: Suthan S. Suthersan, Yardley, Pa.; Gary Keyes, San Anselmo; Kent O'Brien, Petaluma, both of Calif.

[73] Assignee: ARCADIS Geraghty & Miller, Inc., Denver, Colo.

[21] Appl. No.: 09/140,025

[22] Filed: Aug. 26, 1998

[51] Int. Cl.$^7$ .................................................. C02F 1/28
[52] U.S. Cl. ........................................ 405/128; 588/249
[58] Field of Search ....................... 405/128; 435/262.5; 588/249; 166/246; 210/747

[56] References Cited

U.S. PATENT DOCUMENTS

| | | | |
|---|---|---|---|
| Re. 33,102 | 10/1989 | Visser et al. | 166/267 |
| 825,745 | 7/1906 | Mitchell . | |
| 1,286,666 | 12/1918 | Layne . | |
| 1,877,915 | 9/1932 | Lewis . | |
| 2,104,327 | 1/1938 | Kotzebue | 166/21 |
| 2,180,400 | 11/1939 | Coberly | 103/46 |
| 2,523,091 | 9/1950 | Bruce | 166/2 |
| 2,635,696 | 4/1953 | Asketh | 166/1 |

(List continued on next page.)

FOREIGN PATENT DOCUMENTS 3427 532 C1   8/1985   Germany .

OTHER PUBLICATIONS

A Monitoring and Removal Program for Leaked Propane Gas in the Vadose (Unsaturated) Zone: A Case Study (Thomas Lobasso, Jr. and Andrew J. Barber).

Hydrogeologic and Geochemical Investigation, Mt. Olive Greens, Mt. Olive Township, N.J.–Nov., 1982.

Ground Water and Wells—Reference Book for the Water- -Well Industry—4$^{th}$ Printing 1975, Chapter 10, pp. 185–208 and Chapter 20, pp. 375–394.

Water Well Technology—Field Principals of Exploration Drilling and Development of Ground Water and Other Selected Minerals (4 page cover and pages 240–308) (Michael D. Campbell and Jay H. Lehr).

SPL External Vapor Vending (Elimination) Program–Nov. 2, 1983.

Near Surface Geochemical Monitoring of Underground Gas Storage Facilities–Apr., 1986.

Lexin–Nexis—Environment Protection Agency, Upjohn Manufacturing Company–Sep. 30, 1988.

Declaration Statement—Record of Decision; Rod Decision Summary (with attachments); and Responsive Summary, Upjohn Manufacturing Company, Superfund Site, Barceloneta, Puerto Rico.

Public Notice (3 pages).

Fifth National Outdoor Action Conference on Acquifer Restoration, Ground Water Monitoring, and Geophysical Methods—May 13–16, 1991 (Ground Water Mgmt., Book 5 of the Series).

HAZTECH International '88 —Hazardous Waste & Hazardous Materials Management–Sep. 20–22, 1988.

(List continued on next page.)

*Primary Examiner*—David Bagnell
*Assistant Examiner*—Zakiya Walker
*Attorney, Agent, or Firm*—Standley & Gilcrest LLP

[57] ABSTRACT

A method and system are described for removing contaminants from the phreatic zone, also known as the saturation zone, or groundwater. A barrier wall is constructed below the ground surface and in the path of flow of a contaminated groundwater plume. A well is constructed in advance of the barrier wall and is connected to the barrier wall via a pipe. Various remediation media may be lowered into the well to perform remediation on the contaminated groundwater before it passes through the barrier wall.

18 Claims, 3 Drawing Sheets

U.S. PATENT DOCUMENTS

| | | | |
|---|---|---|---|
| 2,765,850 | 10/1956 | Allen | 166/39 |
| 2,875,831 | 3/1959 | Martin et al. | 166/9 |
| 2,969,226 | 1/1961 | Huntington | 262/3 |
| 3,216,905 | 11/1965 | Baptist | 195/2 |
| 3,277,962 | 10/1966 | Flickinger et al. | 166/15 |
| 3,351,132 | 11/1967 | Dougan et al. | 166/11 |
| 3,547,190 | 12/1970 | Wilkerson | 166/75 |
| 3,649,533 | 3/1972 | Reijonen et al. | 210/50 |
| 3,653,438 | 4/1972 | Wagner | 166/266 |
| 3,665,716 | 5/1972 | Rogers et al. | 61/35 |
| 3,705,851 | 12/1972 | Brauer | 210/1 |
| 3,727,686 | 4/1973 | Prates et al. | 166/261 |
| 3,735,815 | 5/1973 | Myers | 166/313 |
| 3,765,483 | 10/1973 | Vencil | 166/265 |
| 3,796,883 | 3/1974 | Smith et al. | 250/260 |
| 3,823,777 | 7/1974 | Allen et al. | 166/266 |
| 3,828,525 | 8/1974 | Copa et al. | 55/68 |
| 3,846,290 | 11/1974 | Raymond | 210/11 |
| 3,980,138 | 9/1976 | Knopik | 166/314 |
| 3,990,513 | 11/1976 | Perch | 166/267 |
| 4,016,930 | 4/1977 | Arnold | 166/266 |
| 4,026,355 | 5/1977 | Johnson et al. | 166/246 |
| 4,126,556 | 11/1978 | Swanson et al. | 210/242 AS |
| 4,167,973 | 9/1979 | Forte et al. | 166/267 |
| 4,183,407 | 1/1980 | Knopik | 166/314 |
| 4,241,787 | 12/1980 | Price | 166/105 |
| 4,283,212 | 8/1981 | Graham et al. | 62/18 |
| 4,296,810 | 10/1981 | Price | 166/265 |
| 4,303,127 | 12/1981 | Freel et al. | 166/266 |
| 4,306,961 | 12/1981 | Taciuk | 208/11 R |
| 4,323,122 | 4/1982 | Knopik | 166/267 |
| 4,366,846 | 1/1983 | Curati, Jr. | 141/1 |
| 4,369,839 | 1/1983 | Freeman et al. | 166/53 |
| 4,401,569 | 8/1983 | Jhaveri et al. | 210/610 |
| 4,435,292 | 3/1984 | Kirk et al. | 210/747 |
| 4,442,901 | 4/1984 | Zison | 166/369 |
| 4,469,176 | 9/1984 | Zison et al. | 166/250 |
| 4,518,399 | 5/1985 | Croskell et al. | 55/16 |
| 4,544,381 | 10/1985 | Schmidt | 55/89 |
| 4,574,062 | 3/1986 | Weitman | 261/147 |
| 4,576,717 | 3/1986 | Collin et al. | 210/610 |
| 4,588,506 | 5/1986 | Raymond et al. | 210/606 |
| 4,593,760 | 6/1986 | Visser et al. | 166/267 |
| 4,625,801 | 12/1986 | McLaughlin et al. | 166/267 |
| 4,660,639 | 4/1987 | Visser et al. | 166/267 |
| 4,662,900 | 5/1987 | Ottengraf | 55/90 |
| 4,664,805 | 5/1987 | Focht | 210/611 |
| 4,683,064 | 7/1987 | Hallberg et al. | 210/605 |
| 4,713,343 | 12/1987 | Wilson, Jr. et al. | 435/264 |
| 4,715,965 | 12/1987 | Sigerson et al. | 210/800 |
| 4,723,968 | 2/1988 | Schippert et al. | 55/80 |
| 4,730,672 | 3/1988 | Payne | 166/266 |
| 4,738,206 | 4/1988 | Noland | 110/346 |
| 4,745,850 | 5/1988 | Bastian et al. | 98/56 |
| 4,749,491 | 6/1988 | Lawes et al. | 210/610 |
| 4,755,304 | 7/1988 | Hallberg et al. | 210/747 |
| 4,765,902 | 8/1988 | Ely et al. | 210/610 |
| 4,780,215 | 10/1988 | Carlson | 210/722 |
| 4,782,625 | 11/1988 | Gerken et al. | 47/1.42 |
| 4,799,878 | 1/1989 | Schaeffer | 431/202 |
| 4,806,148 | 2/1989 | Ottengraf | 55/223 |
| 4,832,122 | 5/1989 | Corey et al. | 166/266 |
| 4,832,711 | 5/1989 | Christel, Jr. et al. | 55/20 |
| 4,842,448 | 6/1989 | Koerner et al. | 405/258 |
| 4,846,134 | 7/1989 | Perry et al. | 123/520 |
| 4,846,852 | 7/1989 | Schweitzer et al. | 55/31 |
| 4,848,460 | 7/1989 | Johnson, Jr. et al. | 166/245 |
| 4,850,745 | 7/1989 | Hater et al. | 405/258 |
| 4,864,942 | 9/1989 | Fochtman et al. | 110/226 |
| 4,872,994 | 10/1989 | Jakob | 210/691 |
| 4,886,119 | 12/1989 | Bernhardt et al. | 166/267 |
| 4,890,673 | 1/1990 | Payne | 166/266 |
| 4,892,688 | 1/1990 | Bernhardt | 261/24 |
| 4,895,085 | 1/1990 | Chips | 110/346 |
| 4,919,570 | 4/1990 | Payne | 405/128 |
| 4,943,305 | 7/1990 | Bernhardt | 55/170 |
| 4,945,988 | 8/1990 | Payne et al. | 166/266 |
| 4,950,394 | 8/1990 | Bernhardt et al. | 210/170 |
| 4,951,417 | 8/1990 | Gerken et al. | 47/1.42 |
| 4,954,258 | 9/1990 | Little | 210/611 |
| 4,966,611 | 10/1990 | Schumacher et al. | 55/20 |
| 4,982,788 | 1/1991 | Donnelly | 166/266 |
| 5,006,250 | 4/1991 | Roberts et al. | 210/610 |
| 5,009,266 | 4/1991 | Dieter | 166/245 |
| 5,015,365 | 5/1991 | Vara et al. | 208/262.1 |
| 5,017,289 | 5/1991 | Ely et al. | 210/610 |
| 5,050,676 | 9/1991 | Hess et al. | 166/267 |
| 5,069,286 | 12/1991 | Roensch et al. | 166/312 |
| 5,076,360 | 12/1991 | Morrow | 166/267 |
| 5,076,727 | 12/1991 | Johnson et al. | 405/128 |
| 5,080,793 | 1/1992 | Urlings | 210/603 |
| 5,086,717 | 2/1992 | McCrossan | 110/346 |
| 5,095,975 | 3/1992 | Bernhardt | 166/67 |
| 5,111,883 | 5/1992 | Savery | 166/269 |
| 5,116,163 | 5/1992 | Bernhardt | 405/128 |
| 5,122,165 | 6/1992 | Wang et al. | 55/38 |
| 5,122,166 | 6/1992 | Hyrcyk et al. | 55/38 |
| 5,143,606 | 9/1992 | Bernhardt | 210/170 |
| 5,143,607 | 9/1992 | Bernhardt | 210/170 |
| 5,147,535 | 9/1992 | Bernhardt | 210/138 |
| 5,161,914 | 11/1992 | Rahn et al. | 405/128 |
| 5,171,103 | 12/1992 | Bernhardt | 405/128 |
| 5,172,764 | 12/1992 | Hajali et al. | 166/267 |
| 5,173,092 | 12/1992 | Rudder | 55/53 |
| 5,180,503 | 1/1993 | Gorelick et al. | 210/758 |
| 5,183,563 | 2/1993 | Rodden | 210/180 |
| 5,185,080 | 2/1993 | Boyle | 210/611 |
| 5,197,541 | 3/1993 | Hess et al. | 166/67 |
| 5,220,958 | 6/1993 | Bernhardt | 166/67 |
| 5,221,159 | 6/1993 | Billings et al. | 405/128 |
| 5,263,795 | 11/1993 | Corey et al. | 405/128 |
| 5,277,815 | 1/1994 | Beeman | 210/605 |
| 5,279,740 | 1/1994 | Basile et al. | 210/610 |
| 5,281,333 | 1/1994 | Bernhardt | 210/170 |
| 5,302,286 | 4/1994 | Semprini et al. | 210/610 |
| 5,318,698 | 6/1994 | Bernhardt | 210/150 |
| 5,330,651 | 7/1994 | Robertson et al. | 210/617 |
| 5,358,357 | 10/1994 | Mancini et al. | 405/128 |
| 5,382,267 | 1/1995 | Savage et al. | 44/623 |
| 5,384,048 | 1/1995 | Hazen et al. | 210/605 |
| 5,389,267 | 2/1995 | Gorelick et al. | 210/758 |
| 5,402,848 | 4/1995 | Kelly | 166/266 |
| 5,425,598 | 6/1995 | Pennington | 405/118 |
| 5,439,594 | 8/1995 | Regan et al. | 210/747 |
| 5,441,365 | 8/1995 | Duffney et al. | 405/128 |
| 5,441,641 | 8/1995 | Vail et al. | 210/611 |
| 5,456,550 | 10/1995 | Devlin | 405/128 |
| 5,480,549 | 1/1996 | Looney et al. | 210/610 |
| 5,545,801 | 8/1996 | Fulton | 588/249 |
| 5,545,803 | 8/1996 | Heath et al. | 588/253 |

| | | | |
|---|---|---|---|
| 5,554,290 | 9/1996 | Suthersan | 210/610 |
| 5,575,589 | 11/1996 | Suthersan | 405/128 |
| 5,588,490 | 12/1996 | Suthersan et al. | 166/370 |
| 5,698,092 | 12/1997 | Chen | 210/94 |
| 5,713,522 | 2/1998 | Lundberg | 239/265.39 |
| 5,833,388 | 11/1998 | Edwards et al. | 405/52 |
| 5,833,855 | 11/1998 | Saunders | 210/611 |
| 5,893,975 | 4/1999 | Eifert | 210/602 |
| 6,007,274 | 12/1999 | Suthersan | 405/128 |

OTHER PUBLICATIONS

The Fifth National Symposium and Exposition on Acquifer Restoration and Ground Water Monitoring–May 21–24, 1985.

Proceedings of the NWWA/API Conference on Petroleum Hydrocarbons and Organic Chemicals in Ground Water—Prevention, Detection and Restoration–Nov. 13–15, 1985.

Volume II, Proceedings of Petroleum Hydrocarbons and Organic Chemicals in Ground Water: Prevention, Detection and Restoration–Nov. 9–11, 1988.

In Situ Aeration of Groundwater: A Technology Overview–Oct. 16–17, 1990.

In Situ Walls, Remediation Engineering, Chapter 7, pp. 187–206.

IN SITU REACTIVE GATE FOR GROUNDWATER REMEDIATION

BACKGROUND OF THE INVENTION

The present invention relates generally to a method and apparatus for removing contaminants from groundwater and, more particularly, to an in situ reactive gate apparatus and method for removing various contaminants including volatile organic compounds (VOCs) from groundwater.

Contamination of the phreatic zone, also known as the zone of saturation, or groundwater with potentially hazardous materials is a common problem facing industry, the government, and the general public. The most common type of VOC pollutants are petroleum-based products. Frequently, as a result of spills, leakage from storage facilities, or surface discharges, contaminants percolate into groundwater, thereby posing a threat to drinking water supplies.

While groundwater is not as susceptible to pollution as surface water, once polluted, its restoration is difficult and long term. Typically, contaminated groundwater is removed from the phreatic zone, treated, and then returned to the phreatic zone. These "pump-and-treat", or above-ground, methods are extremely expensive. There is a need for the development of an in situ apparatus and method for removing contaminants in a more efficient manner.

The present invention involves the use of a new reactive gate technology for removal of contaminants from the saturation zone. It avoids expensive "above ground" remediation methods and provides a more efficient method of remediation.

SUMMARY OF THE INVENTION

In a preferred embodiment of the present invention, a barrier wall is constructed below the ground surface and in the path of flow of a contaminated groundwater plume. A well is constructed in advance of the barrier wall and is connected to the barrier wall via a pipe. Various remediation media may be lowered into the well to perform remediation on the contaminated groundwater before it passes through the barrier wall.

The wall is preferably made of poured cement or bentonite. Within each gate one or more of a plurality of remediation technologies may be incorporated. The present invention incorporates unique gate designs and arrangements which provide for efficient remediation at reduced costs.

In addition to the novel features and advantages mentioned above, other objects and advantages of the present invention will be readily apparent from the following descriptions of the drawings and preferred embodiments.

DETAILED DESCRIPTION OF PREFERRED EMBODIMENTS

Figure 1:
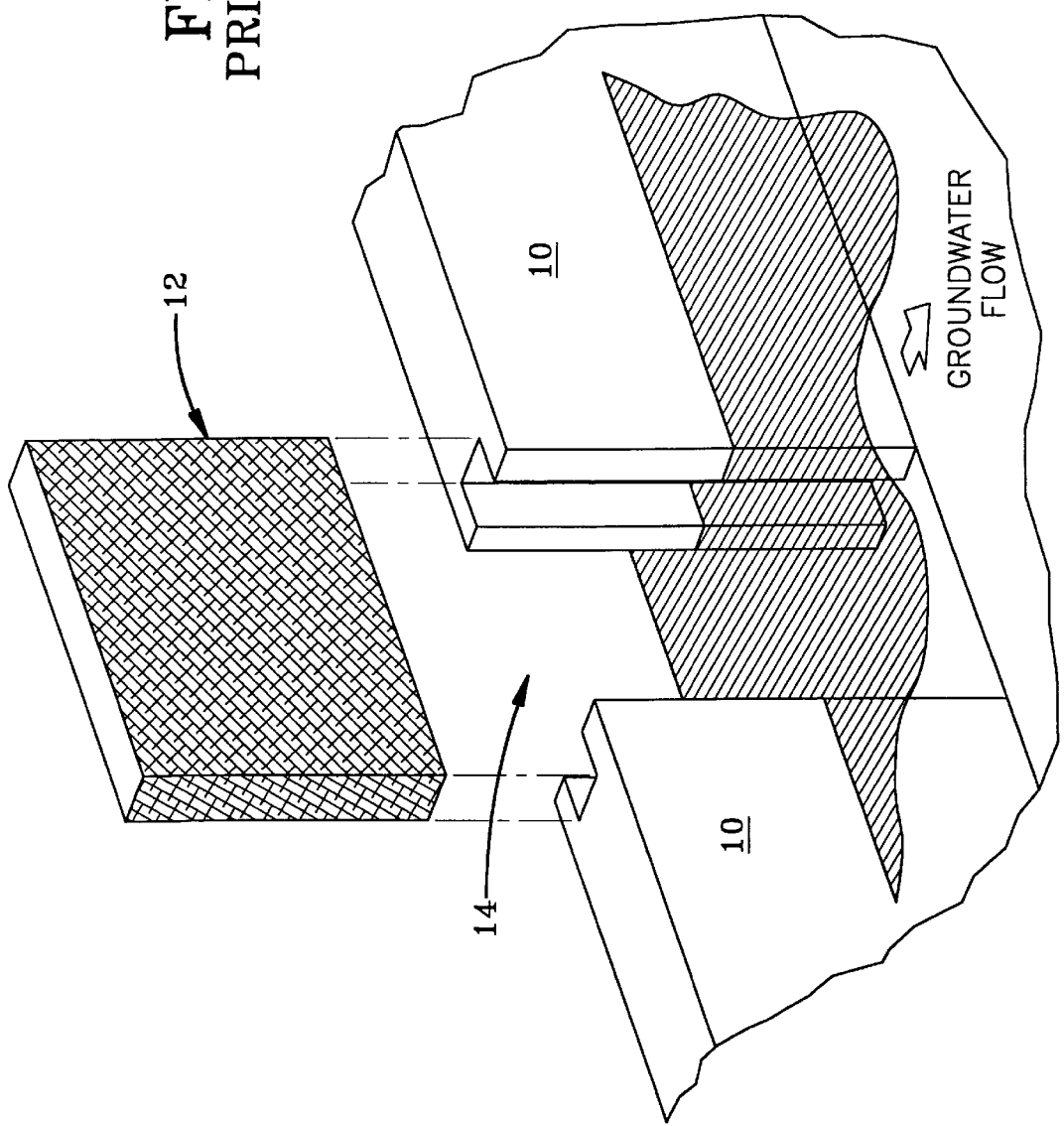
FIG. 1 is a perspective view of a known system of gates.

FIG. 1 shows a known system in which a barrier wall 10 is placed below the ground surface and in the path of the groundwater flow. A gate, or replaceable cassette 12, is designed to be inserted into the barrier wall 10 at zone 14. The water flow cannot pass through the barrier wall 10 and, therefore, is forced to pass through the gate 12 at zone 14. Several drawbacks exist with such a system. First, it is costly to construct because the gate must be designed to fit securely in the wall in a subsurface environment. Second, to replace a gate like the one shown in FIG. 1 would be very difficult. The user would have to dig down to the gate and physically remove it and install another gate in the wall. When considering that a gate may be sixty feet or more beneath the ground surface the replacement of a gate would require significant ground excavation and significant hours of labor to complete the replacement and secure the new gate.

Figure 2:
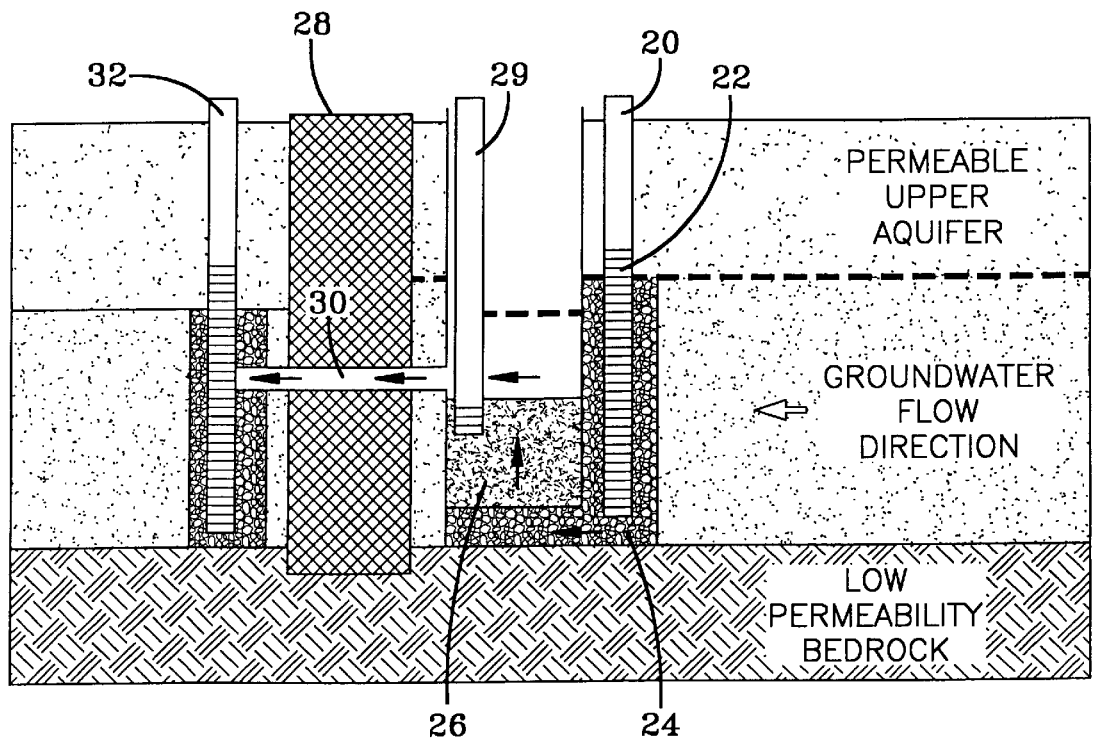
FIG. 2 is a cross sectional view of a preferred embodiment of the present invention.

FIG. 2 illustrates a system of the present invention. A monitoring well 20 is installed in the path of contaminated groundwater flow. A screened portion 22 of the well casing 20 is surrounded by gravel 24. A filter media such as carbon 26 is placed partially in the path of the groundwater flow and after the water has passed through the screened portion of the well 20. A low permeability barrier wall 28 is erected adjacent the monitoring well 20 and acts as a barrier to groundwater flow which has already passed through the well 20. A pipe 30 is installed in the barrier wall 28 and serves as a zone through which the groundwater must flow in order to pass through the barrier wall 28. Another well 32 may be installed after the barrier wall 28 to receive the groundwater that has passed through the filtration media. The groundwater received at well 32 may be pumped up to the ground surface and redelivered to the area below the surface near well 20 and thereby forced to pass through the filtration media again.

Figure 3:
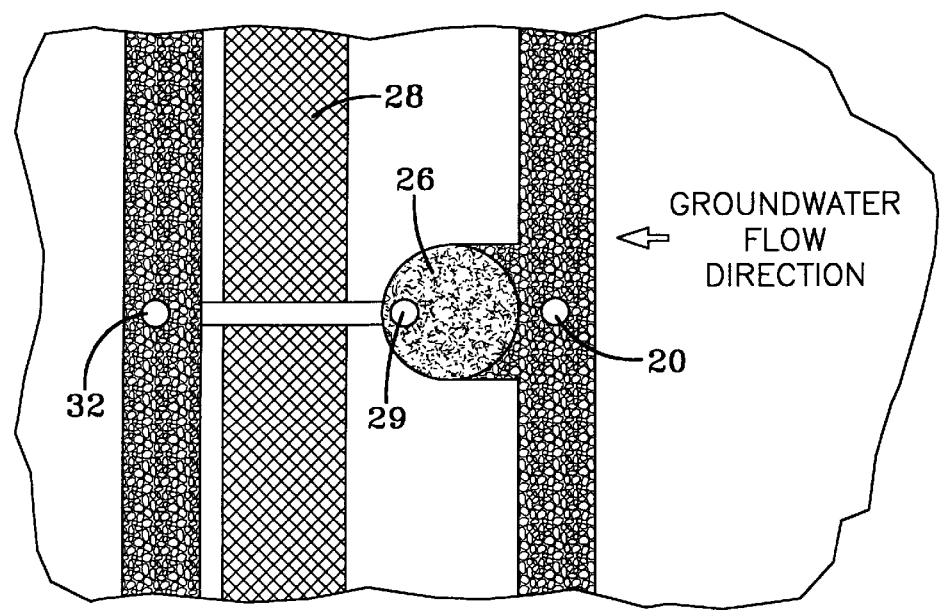
FIG. 3 is a plan view of the system of FIG. 2.

FIG. 3 shows a plan view of the system of FIG. 2. A middle monitoring well 29 may be located just in front of the barrier wall 28 to assist in directing groundwater through the pipe or gate 30.

Figure 4:
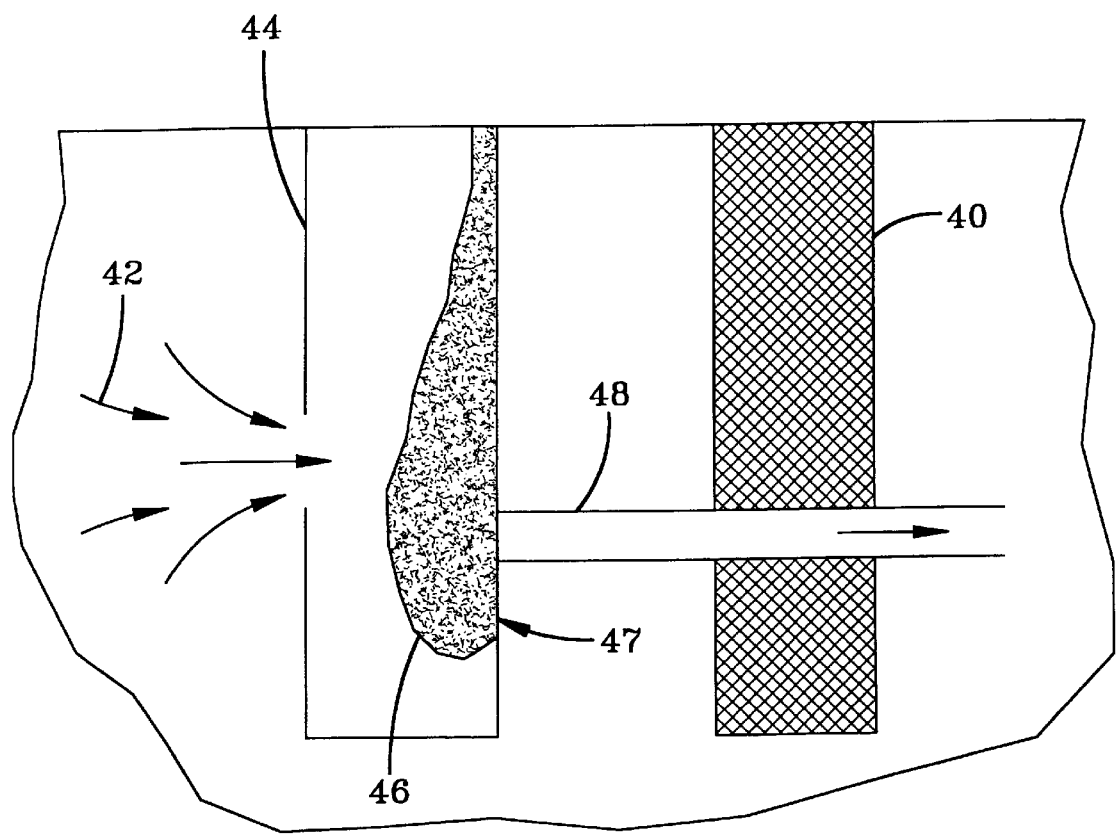
FIG. 4 is a cross sectional view of another embodiment of the present invention.

FIG. 4 shows another embodiment of the present invention in which a barrier wall 40 is constructed in the path of groundwater flow from a contaminated water plume 42. A well 44, preferably having a large diameter, and containing a means of remediation 46 (which acts in this embodiment as a gate 47 to the wall 40) is installed just in front of the wall 40. A pipe 48 is connected to the well 44 and passes through the wall 40. The pipe 48 serves as the means by which the groundwater may pass through the wall 40. Otherwise, the groundwater is substantially prevented from passing through the wall 40. Trenches may be cut in advance of the well and after the wall to aide in directing the groundwater flow in the desired direction.

It is believed that the separation of the wall 40 and the gate 47 is unique to the present invention. By enabling the gate to reside in a well in front of the wall, communicating with the wall via pipe 48, the overall costs of constructing such a system are substantially reduced.

Various media may be placed in the well 44 to act as a means of remediation. For example, a permeable bag filled with activated carbon and/or other suitable cleaning agents may be lowered into the well to act as the gate 47 at the intersection with and/or the entrance of the pipe 48. An added benefit of the present invention is that the means of remediation may be changed without undue effort. Another benefit of the present invention is that the gate of the present invention acts as an "up-flow reactor". Still another benefit of the present invention is that water that has passed through the barrier wall may be captured in a second well, and reinjected back into the contaminated plume 42 and reprocessed through the gate 47.

In addition to activated carbon, other cleaning media, such as ion exchange media, may be placed in permeable bags and lowered into the well 44. The lowering of the cleaning media in the permeable bags may be accomplished by simply using ropes and pulleys or any other way that may be apparent to a user. For extremely heavy bags, a crane may be used to lower the bags into the well. When the cleaning media is sufficiently exhausted of its remediating capability, the permeable bag may be raised out of the well, and a new bag of cleaning media may be lowered back into the well. Although the depth below the surface of gate 47 will vary from site to site, in a typical situation the permeable bag may only need to be lowered approximately 60 feet below the surface to act as the gate 47.

Another cleaning media that may be incorporated in the present invention is crushed oyster shells. Live bacteria cling to the rough surfaces of oyster shells. Providing a heavy concentration of bacteria (aerobic or anaerobic) at the gate 47 will help remediate biodegradable contaminants such as benzene.

Air stripping methods may also be incorporated in well 44 to function along with the gate 47. Air may be injected into the well and forced to pass through packing media in a permeable bag located at and/or acting as the gate 47. The remediation benefits of air stripping are well known in the art and thus will not be described in detail herein. The use of air stripping in association with the present invention is believed to be unique.

Chemical oxidation may also be incorporated into the present invention. Hydrogen peroxide or ozone, for example, may be injected into the well 44 and directed to the gate 47 to react with a contaminant (e.g., 1,4-dioxane) at the gate. UV lamps may also be lowered into the well 44 and directed upon the gate 47 to assist in the remediation process. To the present inventor's knowledge, such techniques have never before been used in a reactor gate as described and shown in the present specification.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A groundwater remediation system, comprising:
   a barrier wall constructed in the path of flow of a contaminated groundwater plume;
   a first well constructed between the barrier wall and the groundwater plume, said well having a permeable lower portion and adapted to allow substantially unimpeded installation or removal of a remediation media;
   a pathway connecting said permeable lower portion of said well to said barrier wall, said pathway passing through said barrier wall in a manner such that the contaminated groundwater first passes through the permeable lower portion, the pathway, and then the barrier wall; and
   a remediation media located in the permeable lower portion of the well, at the location of the pathway, to act as a gate through which the contaminated groundwater must pass.

2. The system of claim 1, further comprising:
   a second well constructed after the barrier wall, said second well adapted to redirect the remediated groundwater back to the contaminated plume.

3. The system of claim 1, wherein the remediation media is housed within a permeable bag that is adapted to be lowered into the first well.

4. The system of claim 1, wherein the remediation media is activated carbon.

5. The system of claim 1, wherein the remediation media is crushed oyster shells.

6. The system of claim 1, wherein the remediation media is a packing media in association with air stripping.

7. The system of claim 1, wherein the remediation media is an ion exchange media.

8. The system of claim 1, wherein the remediation media works as chemical oxidation.

9. The system of claim 8, further comprising at least one UV lamp adapted to be lowered into the first well and directed at the gate.

10. A method for the remediation of a contaminated groundwater plume, said method comprising the steps of:
    constructing a barrier wall in the path of flow of said groundwater plume;
    constructing a first well between the barrier wall and the groundwater plume, said first well including a permeable lower portion and adapted to allow substantially unimpeded installation or removal of a remediation media;
    providing a pathway through said barrier wall and connecting to said permeable lower portion of said first well, thereby defining a gate; and lowering a remediation media into said first well down to said gate.

11. The method of claim 10, further comprising the step of:
    constructing a second well after said barrier wall and adapting said second well to redirect the remediated groundwater back to said contaminated plume.

12. The method of claim 10, wherein said remediation media is activated carbon.

13. The method of claim 10, wherein said remediation media is crushed oyster shells.

14. The method of claim 10, wherein said remediation media is an ion exchange media.

15. The method of claim 10, wherein said remediation media is a packing media in association with air stripping.

16. The method of claim 10, wherein said remediation media is adapted to perform chemical oxidation.

17. A groundwater remediation system, comprising:
    a barrier wall constructed in the path of flow of a contaminated groundwater plume;
    a first well constructed between the barrier wall and the groundwater plume, said well having a permeable lower portion;
    a pipe connecting said permeable lower portion of said well to said barrier wall, said pipe passing through said barrier wall in a manner such that the contaminated groundwater first passes through the permeable lower portion, the pipe, and then the barrier wall;
    a remediation media located in the permeable lower portion of the well, at the location of the pipe, to act as a gate through which the contaminated groundwater must pass; and
    a second well constructed after the barrier wall, said second well adapted to redirect the remediated groundwater back to the contaminated plume.

18. A method for the remediation of a contaminated groundwater plume, said method comprising the steps of:

constructing a barrier wall in the path of flow of said groundwater plume;

constructing a first well between the barrier wall and the groundwater plume, said first well including a permeable lower portion providing a pipe through said barrier wall and connecting to said; permeable lower portion of said first well, thereby defining a gate;

lowering a remediation media into said first well down to said gate; and constructing a second well after said barrier wall and adapting said second well to redirect the remediated groundwater back to said contaminated plume.

\* \* \* \* \*